(12) United States Patent
Stache et al.

(10) Patent No.: US 11,267,328 B2
(45) Date of Patent: Mar. 8, 2022

(54) DRIVE TRAIN AND METHOD FOR OPERATING A DRIVE TRAIN

(71) Applicant: Dr. Ing. h.c.F. Porsche Aktiengesellschaft, Stuttgart (DE)

(72) Inventors: Immo Stache, Vaihingen/Enz (DE); Leo Spiegel, Vaihingen/Enz (DE); Henrik Schrage, Pforzheim (DE)

(73) Assignee: Dr. Ing. h. c. F. Porsche AG, Weissach (DE)

( * ) Notice: Subject to any disclaimer, the term of this patent is extended or adjusted under 35 U.S.C. 154(b) by 139 days.

(21) Appl. No.: 16/388,778

(22) Filed: Apr. 18, 2019

(65) Prior Publication Data

US 2019/0241057 A1 Aug. 8, 2019

Related U.S. Application Data

(62) Division of application No. 15/019,179, filed on Feb. 9, 2016, now abandoned.

(30) Foreign Application Priority Data

Feb. 12, 2015 (DE) ..................... 10 2015 102 024.6

(51) Int. Cl.
*B60K 6/40* (2007.10)
*F16H 57/00* (2012.01)
(Continued)

(52) U.S. Cl.
CPC ............... *B60K 6/28* (2013.01); *B60K 6/26* (2013.01); *B60K 6/40* (2013.01); *B60K 6/405* (2013.01);
(Continued)

(58) Field of Classification Search
CPC .... B60K 2006/266; B60K 6/405; B60K 6/40; B60K 6/28; B60K 6/2648;
(Continued)

(56) References Cited

U.S. PATENT DOCUMENTS 3,905,252 A * 9/1975 Zaiser ...................... F16H 3/66
475/280
5,267,488 A * 12/1993 Hardeman ............. B60K 17/02
180/347

(Continued)

FOREIGN PATENT DOCUMENTS

DE 102 46 839 4/2004
JP 2000-245013 9/2000
(Continued)

*Primary Examiner* — William Kelleher
*Assistant Examiner* — Gregory T Prather
(74) *Attorney, Agent, or Firm* — Gerald E. Hespos; Matthew T. Hespos; Michael J. Porco

(57) ABSTRACT

A drive train (10) for driving a motor vehicle has a combustion engine (12) for providing purely mechanical drive for the motor vehicle. A transmission (16) can be coupled to the combustion engine (12) via a shaft unit (14) for transmitting torque between the motor vehicle transmission (16) and the combustion engine (12). A reserve volume (18) is between the combustion engine (12) and the motor vehicle transmission (16) and is penetrated by the shaft unit (14). The reserve volume (18) can accommodate a high-voltage electric machine for purely electric drive of the motor vehicle or a low-voltage electric machine (32) for applying an electrically generated assistance torque to the motor vehicle transmission (16). As a result, a hybrid functionality can be made available to an at least limited degree, with the result that a cost-effective drive train (10) configured for a hybrid motor vehicle is made possible.

5 Claims, 2 Drawing Sheets

(51) Int. Cl.
*F16H 57/033* (2012.01)
*B60K 6/28* (2007.10)
*B60K 6/26* (2007.10)
*B60K 6/405* (2007.10)
*B60K 6/48* (2007.10)

(52) U.S. Cl.
CPC ........ *B60K 6/48* (2013.01); *B60K 2006/4825* (2013.01); *F16H 2057/005* (2013.01); *F16H 2057/0335* (2013.01); *Y02T 10/62* (2013.01); *Y10S 903/905* (2013.01); *Y10S 903/906* (2013.01); *Y10S 903/907* (2013.01)

(58) Field of Classification Search
CPC ........ B60K 2006/4825; Y10S 903/952; Y10S 903/905; Y10S 903/906; Y10S 903/907; F16H 2057/005; F16H 2057/0335; F16H 57/033; Y02T 10/62
See application file for complete search history.

(56) References Cited

U.S. PATENT DOCUMENTS

| | | | | |
|---|---|---|---|---|
| 5,931,757 | A * | 8/1999 | Schmidt | B60K 6/40 475/2 |
| 6,743,135 | B2 * | 6/2004 | Klemen | F16H 57/043 475/5 |
| 7,819,772 | B2 | 10/2010 | Tenberge | |
| 8,307,729 | B2 * | 11/2012 | Chazotte | F16H 3/006 74/331 |
| 9,227,501 | B2 * | 1/2016 | Garcia | B60K 6/40 |
| 9,435,313 | B2 * | 9/2016 | Gausrab | F02N 15/006 |
| 9,464,713 | B2 * | 10/2016 | Watt | F16H 57/033 |
| 9,969,256 | B2 * | 5/2018 | Mackowiak | B60K 6/405 |
| 10,405,466 | B1 * | 9/2019 | Pradeepkumar | B60L 50/50 |
| 2002/0055407 | A1 * | 5/2002 | Druten | B60K 6/105 475/207 |
| 2003/0064846 | A1 * | 4/2003 | Klemen | B60L 50/61 475/5 |
| 2005/0132560 | A1 * | 6/2005 | Jones | B23Q 9/0014 29/559 |
| 2010/0093476 | A1 * | 4/2010 | Carter | F16H 61/6649 475/80 |
| 2011/0154944 | A1 * | 6/2011 | Mueller | B60K 6/405 74/665 A |
| 2012/0231923 | A1 * | 9/2012 | Fox | F03D 15/10 475/337 |
| 2013/0196809 | A1 | 8/2013 | Ziemer | |
| 2013/0205948 | A1 | 8/2013 | Meier-Burkamp | |
| 2014/0111048 | A1 * | 4/2014 | Garcia | F16H 57/023 310/113 |
| 2014/0228165 | A1 * | 8/2014 | Frank | B60W 10/02 477/5 |
| 2014/0283647 | A1 * | 9/2014 | Blessing | B60K 6/405 74/661 |
| 2015/0307086 | A1 * | 10/2015 | Ketfi-Cherif | B60W 10/08 701/22 |
| 2017/0136869 | A1 * | 5/2017 | Ziefle | B60K 6/40 |
| 2017/0158045 | A1 * | 6/2017 | Goehring | B60K 6/40 |
| 2019/0186618 | A1 * | 6/2019 | Portella | B60K 17/06 |
| 2019/0351756 | A1 * | 11/2019 | Pritchard | B60K 6/547 |
| 2020/0094695 | A1 * | 3/2020 | Bowman | B60K 6/448 |

FOREIGN PATENT DOCUMENTS

| | | |
|---|---|---|
| JP | 2010-031984 | 2/2010 |
| KR | 10-0820402 | 4/2008 |
| KR | 10-2009-0126304 | 12/2009 |

* cited by examiner

DRIVE TRAIN AND METHOD FOR OPERATING A DRIVE TRAIN

CROSS REFERENCE TO RELATED APPLICATION

The present application is a divisional application of U.S. patent application Ser. No. 15/019,179, filed Feb. 9, 2016, the contents of which are hereby incorporated by reference in their entirety. Application Ser. No. 15/019,179 claims priority under 35 USC 119 to German Patent Appl. No. 10 2015 102 024.6 filed on Feb. 12, 2015, the entire disclosure of which is incorporated herein by reference.

BACKGROUND

1. Field of the Invention

The invention relates to a drive train and to a method for operating a drive train, by means of which a motor vehicle can be driven.

2. Description of the Related Art

DE 102 46 839 A1 discloses a drive train for a hybrid motor vehicle. The drive train has an electric machine for providing purely electric drive of the hybrid motor vehicle. The electric machine can be coupled to a transmission input shaft of the motor vehicle transmission between a torsion damper connected to a crankshaft of an internal combustion engine and a motor vehicle transmission.

There is constant need for cost-effective manufacture of a drive train that is configured for a hybrid motor vehicle.

The object of the invention is to provide a cost-effective drive train for a hybrid motor vehicle.

SUMMARY

According to the invention, a drive train is provided for driving a motor vehicle. The drive train has a combustion engine for providing purely mechanical drive for the motor vehicle and a motor vehicle transmission for converting the rotational speed. The motor vehicle transmission can be coupled to the combustion engine via a shaft unit for transmitting torque between the motor vehicle transmission and the combustion engine. A reserve volume is provided between the combustion engine and the motor vehicle transmission and is penetrated by the shaft unit for positioning a high-voltage electric machine for providing purely electric drive for the motor vehicle. Additionally, a low-voltage electric machine is arranged in the reserve volume for applying an electrically generated assistance torque to the motor vehicle transmission.

The reserve volume of the drive train is configured to provide a high-voltage electric machine that is connected to a high-voltage traction battery via correspondingly dimensioned power electronics. As a result, the drive train can be used for a hybrid motor vehicle in which an intended engine power can be made available even in a purely electric fashion by the high-voltage electric machine. This drive train can also be used in a motor vehicle that is not configured as a hybrid motor vehicle, in which case the high-voltage electric machine, a clutch, the high-voltage traction battery and the associated high-voltage power electronics can be eliminated, thereby reducing costs. In this context, the same drive train can be used comprehensively for different motor vehicle models with and without a hybrid functionality in that the high-voltage electric machine is or is not positioned in the reserve volume depending on the motor vehicle model. Thus, the number of identical parts that are common to different models is increased, with the result that the drive train can be manufactured more cost-effectively by mass production.

In the case of a hybrid motor vehicle, the reserve volume is taken up essentially by the high-voltage electric machine and the clutch. In contrast, in the case of a motor vehicle that is not configured as a hybrid motor vehicle, the reserve volume is essentially empty and unused, apart from a shaft or shaft unit.

In the inventive refinement, the reserve volume need not remain empty and unused, but instead is used for the low-voltage electric machine. The low-voltage electric machine is positioned in the reserve volume that is not used by the high-voltage electric machine and essentially requires no additional installation space. In particular, the low-voltage electric machine can make available a significantly lower maximum rate of power compared to the high-voltage electric machine that is provided for supplying purely electric drive for the motor vehicle, with the result that the low-voltage electric machine can be manufactured more cost-effectively. In addition, power electronics dimensioned for relatively low power and a battery that is given smaller dimensions can be provided so that costs can be reduced as compared to the high-voltage electric machine. At the same time, it is possible for the low-voltage electric machine to output power to the motor vehicle transmission, for example to make available additional torque for a suddenly occurring request for power peak ("torque boosting"). Likewise, it is possible, given a sufficiently low requested power, for the motor vehicle to be driven in a purely electric fashion by the low-voltage electric machine, with the result that electric driving of the motor vehicle is then possible, at least to a limited degree, without expensive high-voltage components. This permits a type of cost-effective "entry hybridization" as a further option in a drive train, which is configured as a kit system. The reserve volume provided for the high-voltage electric machine is used for the low-voltage electric machine, thereby enabling a cost-effective hybrid functionality at least to a limited degree, with the result that a cost-effective drive train configured for a hybrid motor vehicle is made possible.

Given the use of a low-voltage electric machine, the shaft unit can be connected to a transmission input shaft of the motor vehicle transmission or can be embodied in one piece with the transmission input shaft of the motor vehicle transmission. The combustion engine is an internal combustion engine. The shaft unit can include an isolating element, in particular a clutch, via which a motor shaft of the combustion engine, e.g. a crankshaft, can be connected to the shaft unit to transmit torque. Part of the shaft unit can be connected to the motor vehicle engine by the disconnecting element, for example via a torsional vibrational damper, while the low-voltage electric machine is connected by the other part of the shaft unit to drive the motor vehicle in a purely electric fashion and/or recuperate brake energy. The drive train may be configured as a parallel hybrid. The shaft unit may be configured to be separately removable. As a result, it is basically possible in the removed state of the shaft unit to connect the combustion engine to the motor vehicle transmission without a low-voltage electric machine connected intermediately, and in the process to eliminate the reserve volume. The drive train can as a result easily be used in the manner of a kit for other designs. The low-voltage electric machine can be connected to power electronics configured for the low-voltage electric machine, and the power electronics can be arranged completely or partially in the reserve volume or outside the reserve volume.

The low-voltage electric machine preferably has a rated operating voltage U below a direct contact limit. This permits the use of conventional components and tools as well as the use of customary workshop personnel, i.e. it permits expensive and costly high-voltage-related measures in terms of material and personnel to be avoided. Such a direct contact limit can be assumed, for example, given a rated operating voltage U <60 V, wherein somewhat higher or lower values are also possible. In any case, the low-voltage electric machine is more powerful than a 12 V starter motor. At the same time, the voltage of the low-voltage electric machine is low enough for a cost-effective energy supply and/or cost-effective power electronics to be made possible.

The reserve volume may be bounded in the axial direction on the engine side or transmission side by a torsional vibrational damper for damping torsional irregularities in the torque generated by the combustion engine. The torsional vibrational damper can have a flywheel that bounds the reserve volume in the axial direction. When the torsional vibrational damper is arranged in the axial direction on the engine side, the reserve volume can be bounded in the axial direction on the transmission side by a cover or torque converter of the motor vehicle transmission.

The reserve volume may be bounded in the radial direction by a clutch case that is attached to the combustion engine and to the motor vehicle transmission. The low-voltage electric machine can have a stator that can be connected to the clutch case, while a rotor of the low-voltage electric machine can be connected directly or indirectly to the transmission input shaft.

The low-voltage electric machine may be connected electrically to a motor vehicle battery to make the necessary voltage available. Thus, the low-voltage electric machine can be fed by the motor vehicle battery that battery already is present for supplying energy to further components of the motor vehicle, for example the 48 V battery. As a result, a separate traction battery is not needed for the low-voltage electric machine.

The combustion engine may be capable of being coupled to the motor vehicle transmission via a switchable disconnecting element. As a result, the combustion engine can be decoupled easily from the shaft unit, and the combustion engine does not cause any unnecessary drag torque. At the same time this makes a purely electric drive for the motor vehicle possible.

The invention also relates to a method for operating a drive train that, such as the drive train described above, in which a low-voltage electric machine is used for providing purely electric drive of the motor vehicle in a power range below the rated maximum power of the combustion engine and/or for starting, or cold starting, the combustion engine. Using the low-voltage electric machine in the reserve volume that is provided for the high-voltage electric machine enables, at least to a limited degree, a cost-effective hybrid functionality and/or cold start functionality, thereby enabling a cost-effective drive train for a hybrid motor vehicle.

The invention will be explained by way of example with reference to the drawings of exemplary embodiments. The features presented below can constitute an aspect of the invention, either individually in each case or in combination.

DETAILED DESCRIPTION

Figure 1:
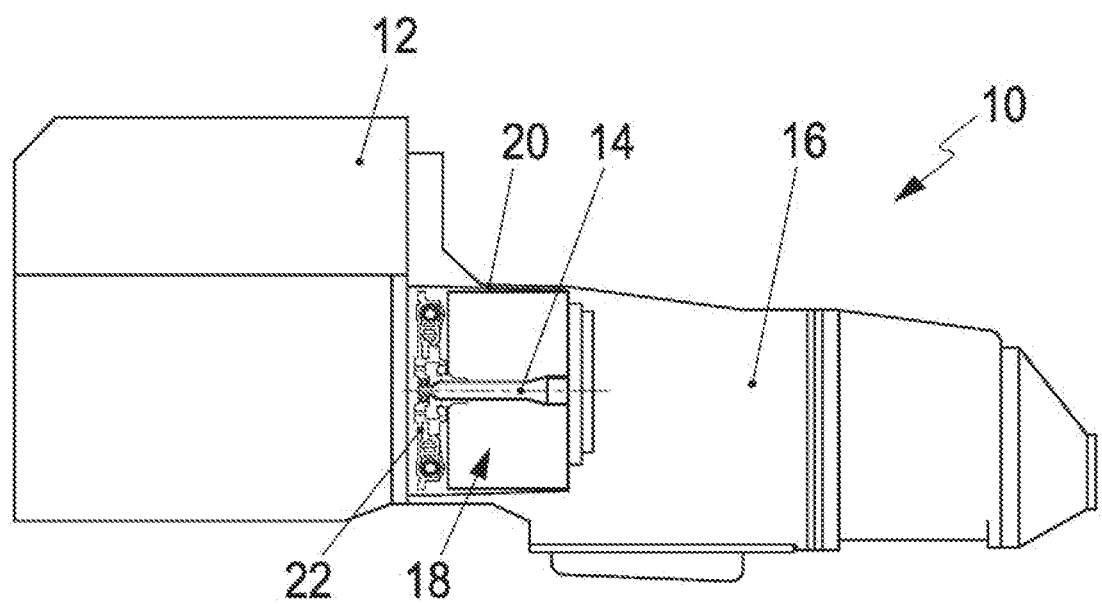
FIG. 1 shows a schematic, partially sectional side view of a drive train.

The drive train 10 illustrated in FIG. 1 has combustion engine 12 that is configured as an internal combustion engine and that can be coupled to a motor vehicle transmission 16 via a shaft unit 14. The shaft unit 14 runs through a reserve volume 18 in which, in the case of use of the drive train 10 for a hybrid motor vehicle, a high-voltage electric machine is provided.

The reserve volume 18 is bounded radially on the outside by a clutch case 20. In the axial direction, the reserve volume 18 is bounded on the engine side by a torsional vibrational damper 22 and on the transmission side by a cover of the motor vehicle transmission 16.

Figure 2:
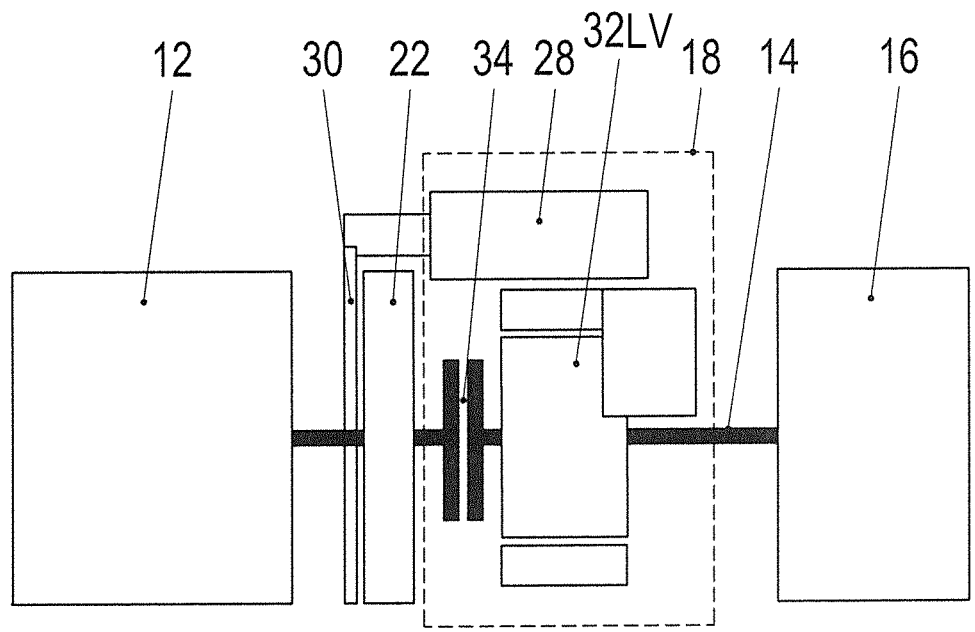
FIG. 2 is a schematic block diagram of the drive train of FIG. 1.
Figure 3:
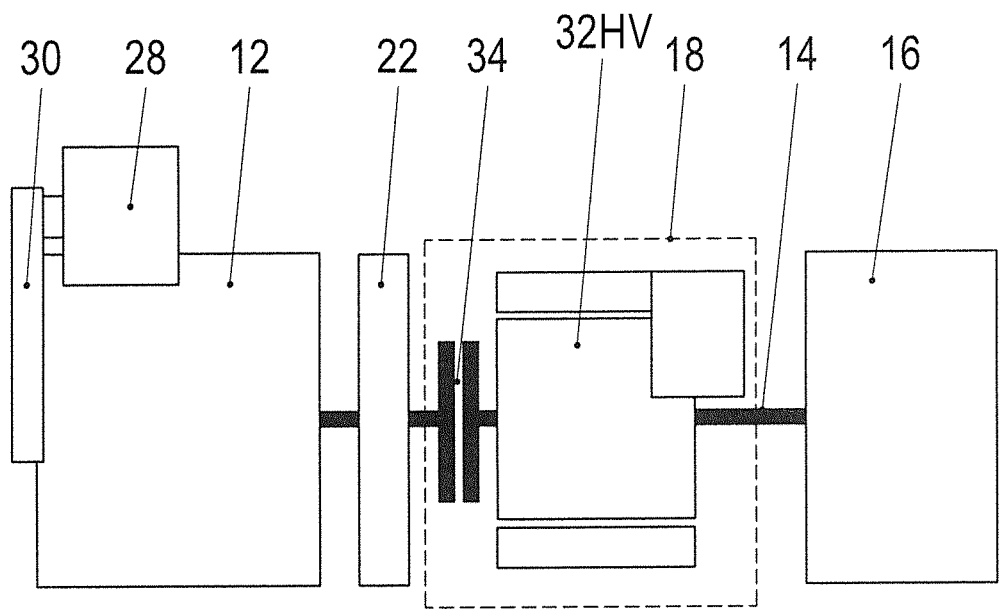
FIG. 3 is a schematic block diagram of a second embodiment of the drive train from FIG. 1.

As is illustrated schematically in FIG. 2, the reserve volume 18 is used by a starter 28 and a low-voltage electric machine 32LV. The combustion engine 12 can be disconnected from the shaft unit 14 by a disconnecting element 34 so that, given a corresponding low requested power, the motor vehicle can be driven purely electrically by the low-voltage electric machine 32LV without having to overcome the drag torque of the combustion engine 12. As illustrated in FIG. 3, the starter 28 can also be positioned out of the reserve volume 18 and can engage, for example, on the side of the combustion engine pointing away from the motor vehicle transmission 16. In any case the starter 28 meshes with a starter ring 30. Movement of the starter 28 from the reserve volume 18 enables disposition of the larger high-voltage electric machine 32HV to be positioned in the reserve volume 18. It is also possible to start the combustion engine 12 using the low-voltage electric machine 32LV, making it possible to eliminate the starter 28. In contrast, in the case of a motor vehicle that is not configured as a hybrid motor vehicle, the reserve volume 18 is essentially empty and unused, apart from the shaft unit 14.

What is claimed is:

1. A method for manufacturing plural types of vehicles, the method comprising:
   providing an internal combustion engine for each of the vehicles;
   providing a transmission spaced from the internal combustion engine to define a reserve volume between the engine and the transmission, the reserve volume being a specified dimension for all of the vehicles regardless of the type of vehicle;
   wherein, when the vehicle is a first type of vehicle, the method comprises mounting a first type of electric machine and a first type of shaft unit that includes a first type of clutch in the reserve volume, the first type of shaft unit and the first type of clutch extending from the internal combustion engine to the transmission and the first type electric machine being mounted for providing power to the vehicle for purely electric driving; and
   wherein, when the vehicle is a second type of vehicle, the method comprises mounting a second type of shaft unit that includes a second type of clutch in the reserve volume between the internal combustion engine and the transmission, the second type of shaft unit and the second type of clutch extending from the internal combustion engine to the transmission.

2. The method of claim 1, wherein when the vehicle is the second type of vehicle, the method further comprises mounting a second type of electric machine in the reserve volume, the second type of electric machine being smaller and less powerful than the first type of electric machine.

3. The method of claim 2, wherein when the vehicle is the second type of vehicle, the method further comprises mounting a battery in the reserve volume, the battery being connected to the second type of electric machine.

4. The method of claim 3, wherein when the vehicle is the second type of vehicle, the method further comprises mounting power electronics configured for the second type of the electric machine.

5. The method of claim 3, wherein when the vehicle is the second type of vehicle, the method further comprises mounting a starter in the reserve volume.

* * * * *